US006802414B2

United States Patent
Buhne

(10) Patent No.: US 6,802,414 B2
(45) Date of Patent: *Oct. 12, 2004

(54) CONVEYOR CHAIN TENSION ADJUSTING DEVICE

(75) Inventor: Hubert Buhne, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/251,289

(22) Filed: Sep. 20, 2002

(65) Prior Publication Data

US 2003/0015405 A1 Jan. 23, 2003

Related U.S. Application Data

(62) Division of application No. 09/586,210, filed on Jun. 2, 2000, now Pat. No. 6,516,941.

(30) Foreign Application Priority Data

Jun. 4, 1999 (DE) .......................................... 199 25 691

(51) Int. Cl.[7] ............................................... B65G 23/44
(52) U.S. Cl. ...................................... 198/813; 474/110
(58) Field of Search .............................. 198/813, 811, 198/807, 810.04; 474/101, 110

(56) References Cited

U.S. PATENT DOCUMENTS

| 2,750,059 | A |   | 6/1956  | Hintz et al. ................. 414/502 |
| 2,788,883 | A |   | 4/1957  | Schwenk .................... 198/813 |
| 3,391,776 | A |   | 7/1968  | Hancock et al. ............ 198/304 |
| 3,521,739 | A |   | 7/1970  | McRobert .................... 198/571 |
| 3,804,231 | A |   | 4/1974  | Maiste ........................ 198/728 |
| 3,814,271 | A |   | 6/1974  | Lööck ......................... 414/491 |
| 3,901,563 | A | * | 8/1975  | Day ............................. 305/146 |
| 4,128,952 | A |   | 12/1978 | Duke et al. ................... 37/423 |
| 4,362,005 | A |   | 12/1982 | Hanaway et al. ............ 56/14.6 |
| 4,893,883 | A | * | 1/1990  | Satzler ........................ 305/146 |
| 5,188,174 | A |   | 2/1993  | Anderson, Jr. et al. |
| 5,334,106 | A |   | 8/1994  | Purcell ........................ 474/110 |
| 5,641,058 | A |   | 6/1997  | Merten et al. .......... 198/810.04 |
| 5,651,447 | A |   | 7/1997  | Huang ........................ 198/509 |
| 5,769,601 | A |   | 6/1998  | Agne et al. ................. 414/799 |
| 5,899,321 | A | * | 5/1999  | El-Ibiary .................... 198/807 |
| 6,296,318 | B1|   | 10/2001 | Simons et al. |
| 6,516,941 | B1| * | 2/2003  | Buhne ........................ 198/813 |

FOREIGN PATENT DOCUMENTS

| DE | 854 444  | 11/1952 |
| DE | 36 04 488 | 9/1988 |
| DE | 35 31 552 | 3/1996 |
| DE | 43 08 084 | 6/1998 |
| JP | 7 228326  | 8/1995 |
| SU | 1242 451  | 7/1986 |

* cited by examiner

Primary Examiner—Robert A. Siconolfi
(74) Attorney, Agent, or Firm—Husch & Eppenberger, LLC; Robert C. Haldiman; David A. Chambers

(57) ABSTRACT

Chain conveyors in an agricultural harvesting machine can be tensioned by means of a tension adjusting device including an adjusting unit which is coupled to a displaceable shaft via a linkage means or connector members. The adjusting units are advantageously hydraulic cylinders controlled in synchronism. The hydraulic cylinders can be mutually independently pressurized via bypass lines incorporating control valves.

13 Claims, 4 Drawing Sheets

CONVEYOR CHAIN TENSION ADJUSTING DEVICE

CROSS REFERENCE TO RELATED APPLICATIONS

This is a divisional application of prior application Ser. No. 09/586,210, filed Jun. 2, 2000, and now U.S. Pat. No. 6,516,941 which claimed priority of German Application No. 199 25 691.8 filed on Jun. 4, 1999.

TECHNICAL FIELD OF THE INVENTION

The present invention relates generally to agricultural machinery and, more particularly, to a tension adjusting device for chain conveyors in agricultural harvesting machinery.

BACKGROUND OF THE INVENTION

Agricultural harvesting machines are commonly equipped with chain conveyors to transport crops from one part of the machine to another. In particular, standard combine harvesters are equipped with three chain conveyors. The first chain conveyor, the feed conveyor, transports crops from the cutting table to the threshing mechanism. The second conveyor, sometimes referred to as the tailings or returns conveyor, returns any unthreshed material from the sieve device to the threshing mechanism, while the third conveyor transports the grain to the grain tank. The width of the conveyors determines the number of conveyor chains used. For example, the feed conveyor is normally equipped with two conveyor chains whereas the second and third conveyors are each equipped with only one conveyor chain. The second and third conveyors are also equipped with partition walls which are located centrally between two parallel walls of closed housings surrounding the conveyors. The conveying span of the chain is separated from the empty span by the partition wall.

It is generally known that each chain in a chain conveyor must be pre-tensioned. This pre-tensioning must be regularly checked before starting work and adjusted if necessary. The tension on the conveyor chains must also be relieved when the machine remains unused for long periods of time. For these reasons, each chain conveyor is normally furnished with a mechanical tensioning device. These devices are equipped with pre-tensioned springs in order to absorb overloading on the chain and to prevent the chain from breaking.

A disadvantage of these mechanical tensioning devices is that two people are required to install and operate the system. The tensioning and detensioning of the chains is laborious and time consuming. Moreover, the tensioning device as a whole is relatively expensive. In addition, the tension of each single chain has to be checked during the daily inspection of the harvesting machine prior to starting work.

SUMMARY OF THE INVENTION

In accordance with the present invention a tension adjusting device includes a displaceable shaft associated with each chain conveyor. The displaceable shaft may be moved to adjust the tension on the conveyor chain. An adjusting unit contains an adjusting member that is connected with the displaceable shaft by a linkage means. Movement of the adjusting member by the adjusting unit induces movement in the displaceable shaft through the linkage means, thereby adjusting the tension in the conveyor chain.

In one embodiment, the adjusting unit is a hydraulic cylinder, and the piston rod of the cylinder is the adjusting member.

In another embodiment, the linkage means includes a plurality of swing levers supporting the displaceable shaft; a coupling rod is connected to one end of each of the swing levers; and a transverse member connects the ends of the coupling rods opposite their connection with the swing levers with the adjusting member.

In another embodiment, a connector member in the form of a U-shaped yoke is carried by the adjusting member and connects the adjusting member with and rotatably supports the displaceable shaft.

An object of the invention is to propose a simple and particularly installation- and service-friendly arrangement which will permit the tensioning and detensioning processes to be accomplished in the least amount of time.

This and other objects, aspects, features and advantages of the present invention will become apparent from the following detailed description when taken in conjunction with the reference drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 6 is a block circuit diagram of the control system for the hydraulic cylinders.

DETAILED DESCRIPTION

Figure 1:
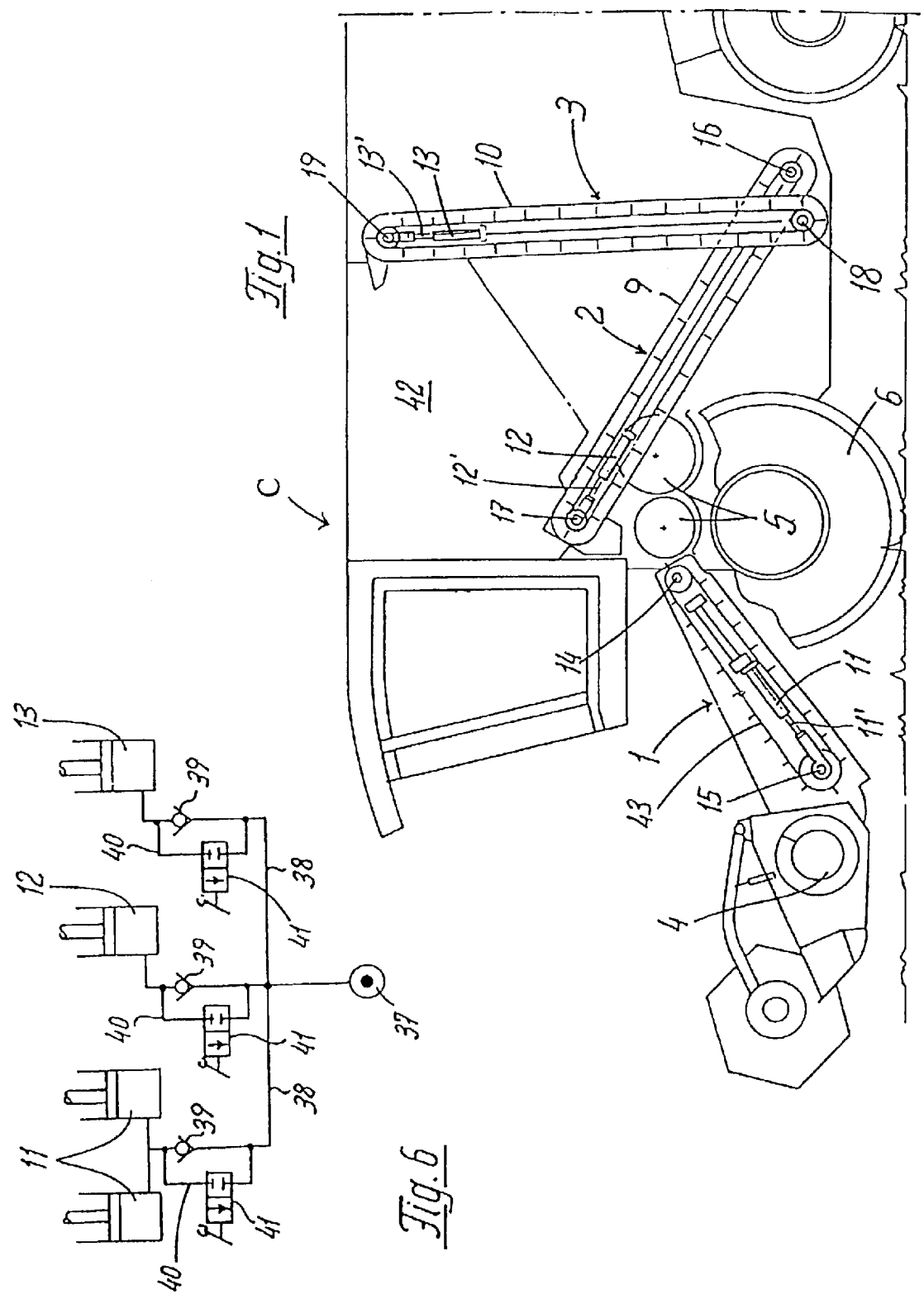
FIG. 1 is the frontal region of an agricultural harvesting machine in the form of a combine harvester incorporating three chain conveyors.

The frontal part of a combine harvester C illustrated in FIG. 1 is equipped with three chain conveyors 1, 2 and 3. The chain conveyor 1 conveys the crop transported thereto by a header auger 4 to an indicatively illustrated threshing mechanism 5. The chain conveyor 1 is located between the header auger 4 and the driven front wheels 6 of the combine harvester. It runs upwardly toward the front wheels 6. The tailings or return conveyor 2 conveys the incompletely threshed crop back to the threshing mechanism 5. The chain conveyor 3 conveys the sieved grains to the grain tank 42. The chain conveyor 1 used for drawing in the crop preferably comprises two conveyor chains 43, while the other two chain conveyors 2 and 3 are only equipped with one conveyor chain 43. Moreover, the two chain conveyors 2 and 3 are arranged within closed housings 9 and 10. The tension adjusting devices, which will be explained in more detail hereinafter, are equipped with controlled hydraulic cylinders 11, 12 and 13. The chain conveyor 1 is equipped with a fixed driveable shaft 14 and a displaceable shaft 15. In correspondingly manner, the conveyor 2 is equipped with a fixed driveable shaft 16 and a displaceable shaft 17. In similar manner, the chain conveyor 3 is equipped with a fixed driveable shaft 18 and a displaceable shaft 19. Mutually spaced feed rake slots are fixed to the chain in the conveyor 1 and feed plates 29 are fixed to the chains in the conveyors 2 and 3.

Advantageously the tension adjusting elements in the tension adjusting devices are hydraulic cylinders 11, 12 or 13, although one should not exclude the possibility of using mechanical, motor driven, linear adjusting devices. One benefit of using hydraulic cylinders 11, 12, 13 is that they can be installed by a single person without any problem. To tension the conveyor chains 1, 2, 3, the hydraulic cylinders are supplied with pressurized oil as hereinafter described. Since a hydraulic system is already available in an agricultural harvesting machine C, the extra costs are extremely small. The components associated with the hydraulic cylinder are simple components which can be easily installed and have a long life. The arrangement of the hydraulic cylinder or the hydraulic cylinders and the design of the linkage or the connector members is determined by the size and the positioning of the conveyor 1, 2, 3, within the machine C.

Figure 2:
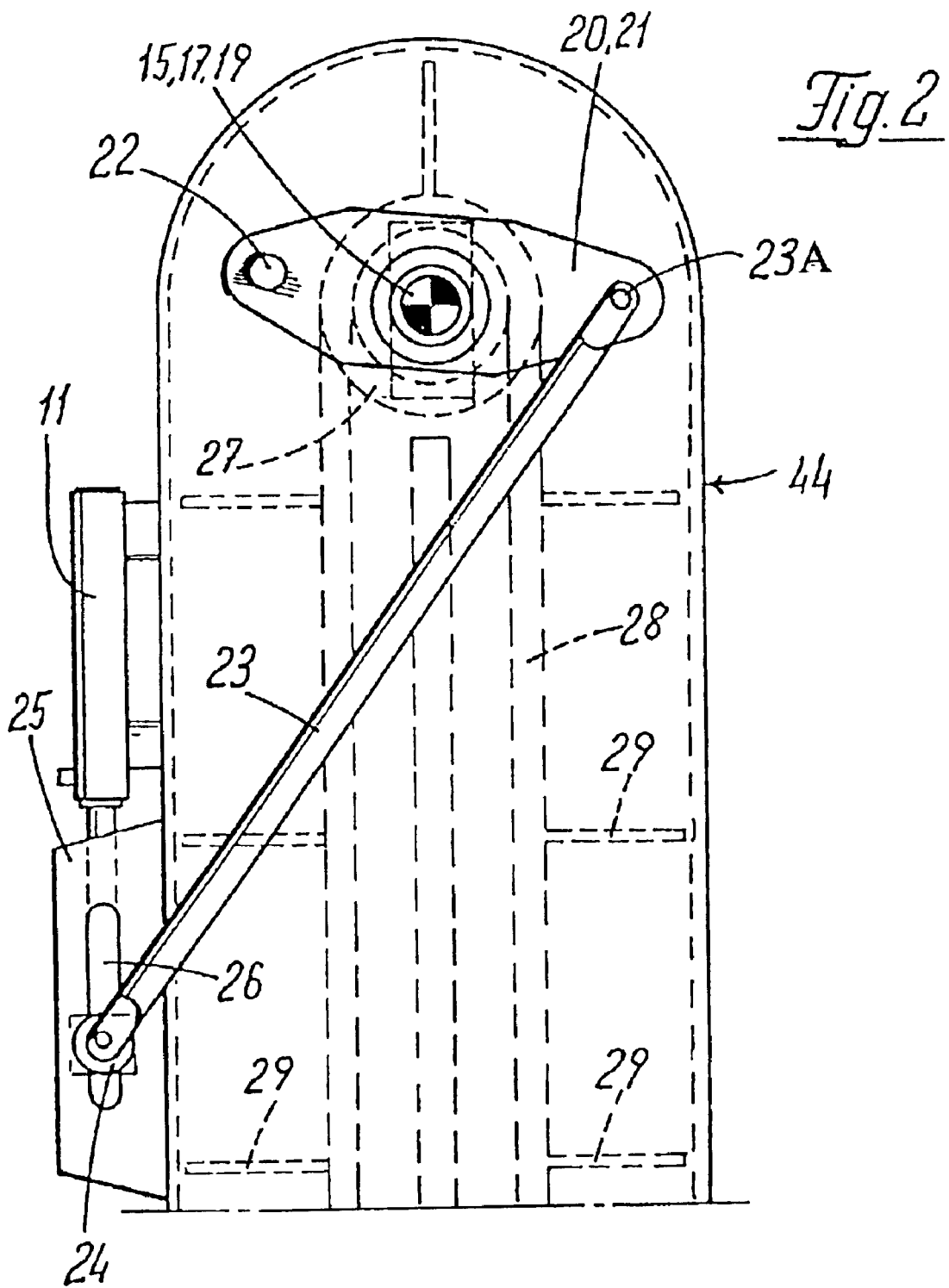
FIG. 2 is a side view of the tension adjusting device in a first embodiment.
Figure 3:
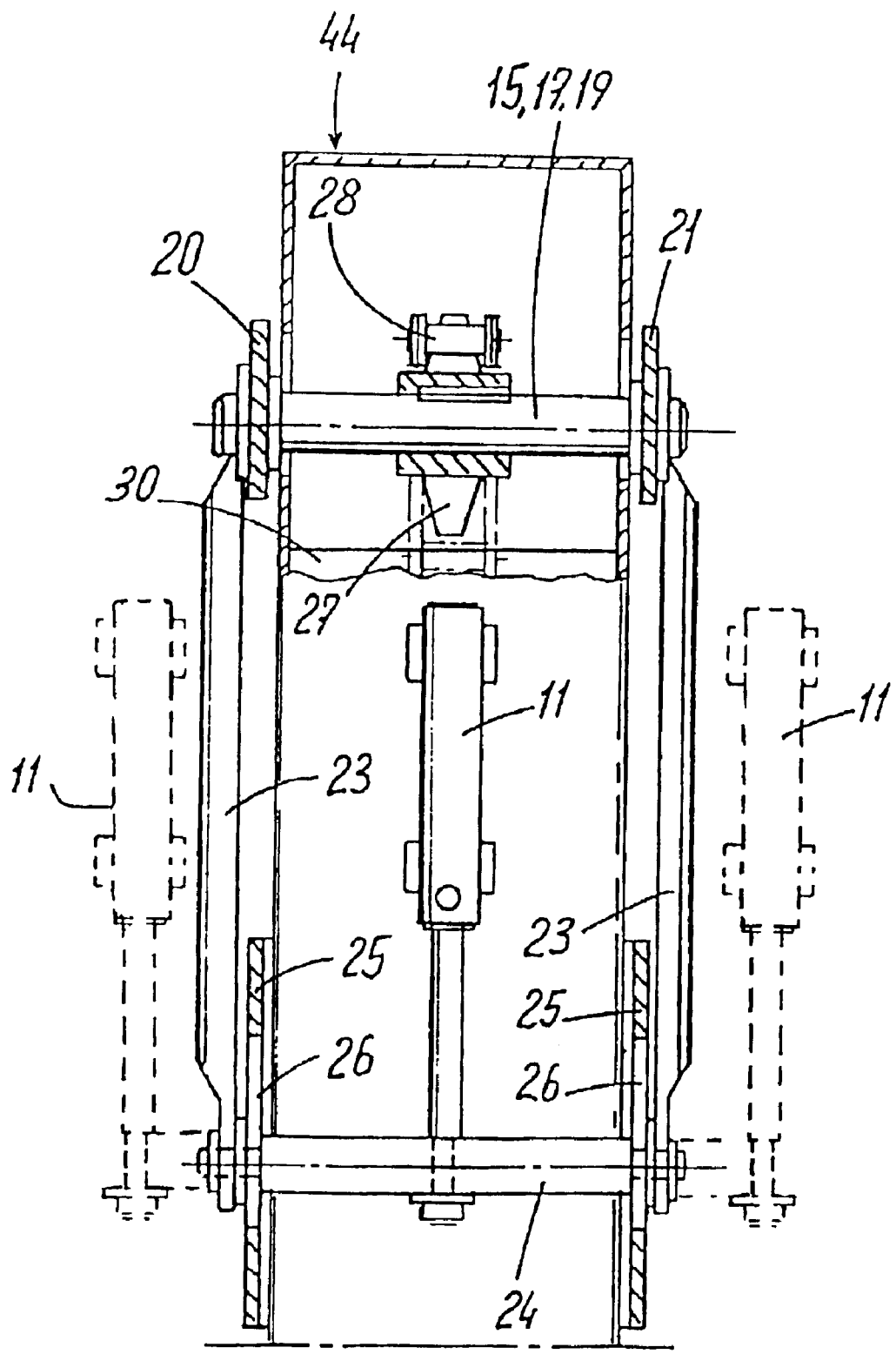
FIG. 3 is a frontal view of the tension adjusting device of FIG. 2.

In FIGS. 2 and 3, the displaceable shaft (i.e. 15, 17, or 19) is rotatably mounted in two swing levers 20, 21 disposed externally near the walls of the housing 44 for the chain conveyor. The chain conveyor is provided with a partition wall. A pivotal axis 22 at one end of the swing levers is offset from the shaft 15, 17 or 19 but is axially parallel therewith. Coupling rods 23 are articulated at 23A to the end of the swing levers 20, 21 opposite the pivotal axis. The opposite ends of the two coupling rods are attached to a transverse member 24 which is engaged centrally by the piston rod 11' of the hydraulic cylinder e.g. 11. This hydraulic cylinder 11 is attached to the wall of the housing 44 facing the pivotal axis 22. As shown in FIG. 2, the shaft 15 lies approximately midway between the pivotal axis 22 and the articulation point 23A for the coupling rod 23. Favorable transmission of the forces applied by the hydraulic cylinder 11 results when the displaceable shaft 15, 17, or 19 is mounted centrally between the pivot axis 22 and the articulation point 23A of the swing levers 20, 21. The swing levers 20, 21 then operate as a single arm, thereby resulting in a very effective moment on the displaceable shaft 15, 17, or 19. Hence, as shown in FIG. 1 and 2, when the piston rod of the hydraulic cylinder 11 extends away from the displaceable shaft 15, 17, or 19, the distance between the shafts 14, 15; 16, 17; or 18, 19, respectively, is increased thereby increasing the tension on the chain 43 and when the piston rod of the hydraulic cylinder 11 retracts towards the displaceable shaft, the distance is decreased thereby reducing the tension of the chain 43.

To save space, it is expedient if the transverse member 24 or the piston rods 11' are guided. Two guide profiles 25 are fixed to the same wall of the housing, these being provided with slots 26 in which the transverse member 24 is guided. Although in this case, the coupling rod would be inclined relative to the direction of conveyance of the chain conveyor, the hydraulic cylinder or the hydraulic cylinders would nevertheless be accessible. The guide profile 25 is arranged on the same wall of the housing as the hydraulic cylinder 11. This embodiment is particularly recommended when the width of the chain conveyor 1, 2, or 3 is relatively large, for example, in the case of the feed chain conveyor 1.

To increase the tensional force, it is also possible to connect a hydraulic cylinder (e.g. 11) to each coupling rod 23. A suitable arrangement is shown in phantom lines in FIG. 3 where the tension adjusting device incorporates two hydraulic cylinders 11 which are articulated to the associated ends of the two coupling rods 23. The hydraulic cylinders 11 are then controllable in synchronism.

A sprocket 27 is fixed on the shaft 15, 17 or 19 so as to rotate therewith and the conveyor chain 28 is entrained thereover. Mutually spaced feed plates 29 (see FIG. 2) are fixed to the conveyor chain 28. A similar sprocket is mounted on the fixed shaft 14 so as to rotate therewith and thereby drive the conveyor chain 28.

Figure 4:
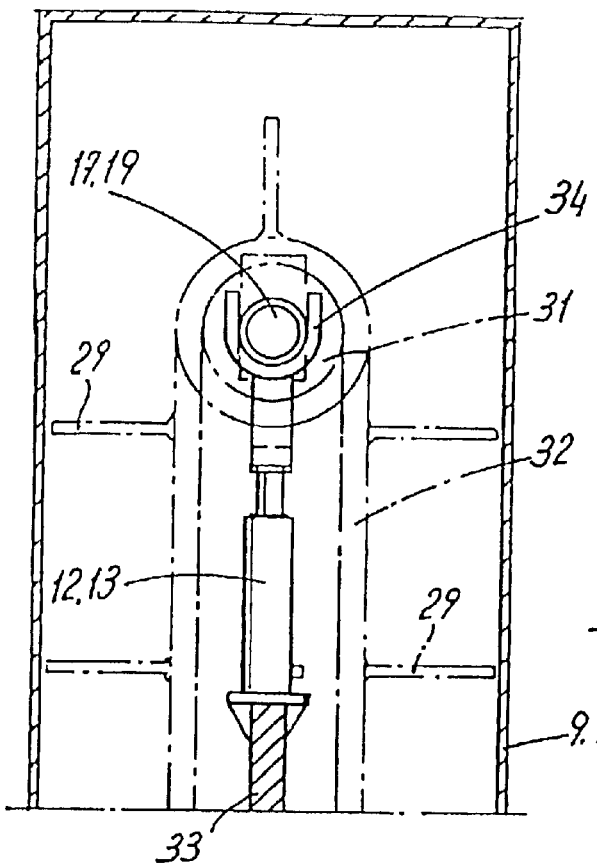
FIG. 4 is a side view of the tension adjusting device in a second embodiment.
Figure 5:
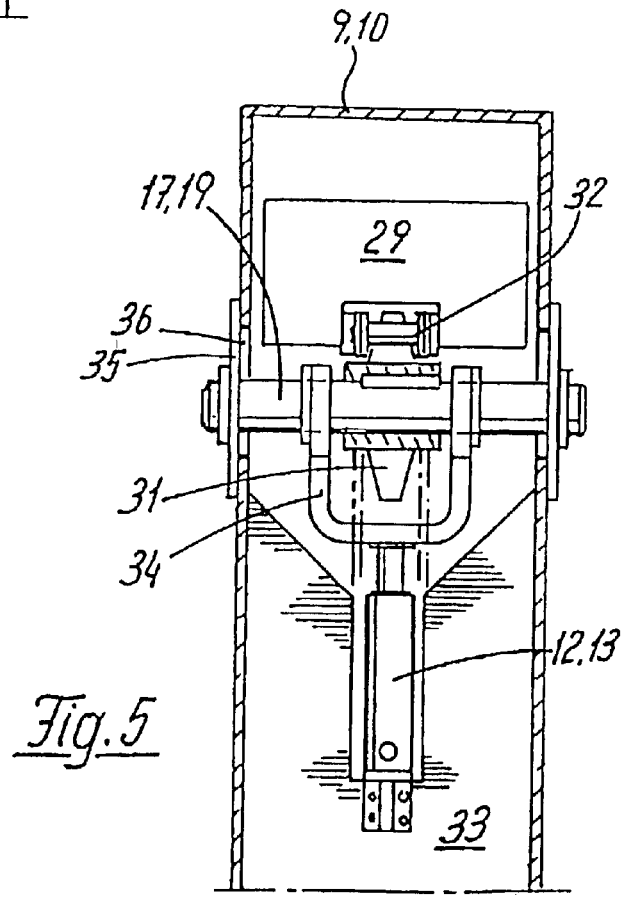
FIG. 5 is a frontal view of the tension adjusting device of FIG. 4.

The embodiment shown in FIGS. 4 and 5 is particularly well-adapted for use with the chain conveyors 2 and 3. This embodiment is particularly suitable for the conveying to the grain tank and for the return of threshed material to the threshing device since these conveyors are relatively narrow. A sprocket 31 is fixed on the shafts 17 and 19 so as to rotate therewith and the conveyor chain 32 is guided thereover. The belts of chain conveyors 2 and 3 are equipped with partition walls 33 which have Y-shaped recesses (see FIG. 5) below the shafts 17, 19 into which the hydraulic cylinders 12, 13 are inserted. Bifurcated U-shaped yokes 34 are fixed to the piston rods 12', 13' of the hydraulic cylinders 12, 13, the shafts 17, 19 being mounted therein. To prevent the displaceable shaft 17, 19 from jamming or tilting, provision is made for the shaft to be guided in slots 36 in two parallel housing walls extending at right angles to the shaft 17, 19. Guide disks 35 disposed at the ends of these shafts slide over the exterior of the housing and cover the slots. The slots 36 create a free-space for the displacement of the shafts 17, 19. The lower shafts 16, 18 are mounted at fixed points and are driveable. Sprockets of similar construction to the sprockets 31 are mounted thereon. These conveyor chains 32 have feed plates 29 inserted therein. This embodiment is extremely simple since the existing partition wall is used and the mounting for the displaceable shaft is established by means of the yoke.

In an advantageous arrangement, the hydraulic cylinders for each of the chain conveyors are controllable in common. The circuit diagram of FIG. 6 shows that two hydraulic cylinders 11 are used for the chain conveyor 1 while just one hydraulic cylinder 12, 13 is employed in the respective chain conveyors 2 and 3. Pressurized oil is supplied from a common pressure source 37 over the pressure lines 38 to each of the hydraulic cylinders 11, 12, 13. A non-return valve 39 is installed in each of the respective supply lines to the hydraulic cylinders 11, 12, 13 in such a manner that the pressurized oil can flow only in the direction in which the piston rods 11', 12', 13' extend from the hydraulic cylinders 11, 12, 13. For load relieving purposes, controlled valves 41 are provided in the bypass lines 40 so that the load can be selectively removed from either the two cylinders 11 or the cylinders 2 or 13. With this design, it is possible to apply pressure simultaneously to all of the hydraulic cylinders and thereby tension each of the chains. The same pressure is thus applied to all of the cylinders. However, if different tensional forces are required, this can be done by using pistons of different diameter. The non-return valve prevents oil from returning, but the bypass line can relieve the load on a hydraulic cylinder when necessary. Whenever the drive motor of the harvesting machine is restarted, each of the chain tension adjusting devices is simultaneously and automatically supplied with the hydraulic pressures associated therewith and the piston-cylinder units are refilled where necessary. The low pressure hydraulic system in the machine is particularly advantageous and fully adequate for this purpose.

Other objects, features and advantages of the present invention will be apparent to those skilled in the art. While preferred embodiments of the present invention have illustrated and described, this has been by way of illustration and the invention should not be limited except as required by the scope of the appended claims.

What is claimed is:

1. A conveyor adjustment device for an agricultural harvesting machine, the conveyor adjustment device comprising:

at least one chain conveyor with at least one chain that is guided over rotatable sprockets mounted on axially parallel shafts separated by a distance; and a tension adjusting device wherein one of the axially parallel shafts is displaceable away from the other shaft, whereby the distance between the shafts is increased and including a controllable adjusting unit coupled to the shaft that is displaceable for adjusting the tension of the at least one chain conveyor, the at least one chain conveyor including a partition wall spaced from and extending parallel with two parallel walls of a housing for the at least one chain conveyor, the partition wall having a recess adjacent the displaceable shaft, the controllable adjusting unit including at least one hydraulic cylinder located within the recess and supported by the partition wall, a piston rod associated with the at least one hydraulic cylinder, and wherein the controllable adjusting unit includes a U-shaped yoke operatively connected to the piston rod and in which the displaceable shaft is rotatably supported.

2. A conveyor adjustment device for an agricultural machine, the conveyor adjustment device including:

at least one chain conveyor with at least one chain that is guided over rotatable sprockets mounted on axially parallel shafts; and a tension adjusting device wherein one of the axially parallel shafts is displaceable relative to the other shaft and including a controllable adjusting unit coupled to the displaceable shaft for adjusting the tension of the at least one chain conveyor, the controllable adjusting unit including at least one hydraulic cylinder and a piston rod associated with the at least one hydraulic cylinder, the at least one chain conveyor including a partition wall spaced from and extending parallel with two parallel walls of a housing for the at least one chain conveyor, wherein the at least one hydraulic cylinder is supported by the partition wall, and wherein the controllable adjusting unit includes a U-shaped yoke operatively connected to the piston rod, and the U-shaped yoke having two U-shaped distal ends in which the displaceable shaft is rotatably supported.

3. The conveyor adjustment device according to claim 2, wherein the motion of the displaceable shaft is guided by slots contained in the two parallel walls of the housing for the at least one chain conveyor.

4. The conveyor adjustment device according to claim 1, further including a system for controlling said at least one hydraulic cylinder that includes a non-return valve in a supply line to each of said at least one hydraulic cylinder and a control valve acting as a bypass line whereby a load on each of said at least one hydraulic cylinder can be relieved.

5. The conveyor adjustment device according to claim 2, further including a system for controlling the at least one hydraulic cylinder being controllable by a system that includes a non-return valve in a supply line to the at least one hydraulic cylinder and a control valve acting as a bypass line whereby a load on the at least one hydraulic cylinder can be relieved.

6. The conveyor adjustment device according to claim 1, wherein the motion of the displaceable shaft is guided by slots contained in the two parallel walls of the housing for the at least one chain conveyor.

7. The conveyor adjustment device according to claim 6, further including a system for controlling a plurality of hydraulic cylinders that includes a non-return valve in a supply line to each hydraulic cylinder for the plurality of hydraulic cylinders and a control valve acting as a bypass line whereby a load on each hydraulic cylinder for the plurality of hydraulic cylinders can be relieved.

8. The conveyor adjustment device according to claim 1, further including a system for controlling the at least one hydraulic cylinder being controllable by a system that includes a non-return valve in a supply line to the at least one hydraulic cylinder and a control valve acting as a bypass line whereby a load on the at least one hydraulic cylinder can be relieved.

9. A conveyor adjustment device for an agricultural harvesting machine, the conveyor adjustment device comprising of:

at least one chain conveyor with at least one chain that is guided over rotatable sprockets mounted on axially parallel shafts separated by a distance, wherein one of the shafts is displaceable;

swing levers having openings for receiving the displaceable shaft, the displaceable shaft being rotatably mounted in the openings;

a pivot axis at a first end of the swing levers and a connection point at a second end of the swing levers;

a hydraulic cylinder having a piston rod operatively connected to a distal end of a coupling rod, the coupling rod having a second end operatively attached to the connection point of the swing levers;

a housing having walls extending parallel with respect to each other and the piston rod, the walls having slots for receiving a pin operatively attached to the distal ends of the coupling rod; and wherein when the piston rod of the hydraulic cylinder extends away from the displaceable shaft, the distance is increased thereby increasing the tension on the chain and when the piston rod of the hydraulic cylinder retracts towards the displaceable shaft, the distance is decreased thereby reducing the tension of the chain.

10. A tension adjustment device for a conveyor, said conveyor defining a longitudinal axis and said conveyor having a conveyor chain and a belt that turn in unison, and said conveyor having a first axle having a sprocket operatively engaged with said conveyor chain and at least one other axle, said first axle being displaceable toward and away from said at least one other axle, and said first axle defining a transverse axis, and said first axles being mounted on a support, the tension adjusting device comprising;

a hydraulic cylinder being substantially aligned with said longitudinal axis of said conveyor and being substantially aligned with said conveyor chain along said transverse axis of said first axle, and being substantially within a width of said belt, said hydraulic cylinder having a piston rod;

a bifurcated mount operatively connecting a first end of said piston rod to said first axle on both sides of said conveyor chain along said transverse axis of said first axle;

said piston rod being anchored at a second end relative to said support such that extension of said piston rod displaces said first axle away from said at least one other axle and retraction of said piston rod displaces said first axle towards said at least one other axle.

11. The tensioning adjustment device of claim 10 wherein said support is a housing and said second end of said piston rod is anchored to a transverse member fixed to said housing.

12. The tension adjustment device of claim 11 wherein said transverse member is a partition wall.

13. The tension adjusting device of claim 11 wherein said housing has slots supporting said first axle and guiding the displacement of said first axle.

* * * * *